United States Patent
Jia et al.

(10) Patent No.: US 10,705,768 B2
(45) Date of Patent: Jul. 7, 2020

(54) METHOD AND SYSTEM FOR MANAGING STORAGE USING AN INTERMEDIATE STORAGE AREA

(71) Applicant: EMC IP Holding Company LLC, Hopkinton, MA (US)

(72) Inventors: Ruiyong Jia, Beijing (CN); Jian Gao, Beijing (CN); Lifeng Yang, Beijing (CN); Xinlei Xu, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 75 days.

(21) Appl. No.: 15/630,912

(22) Filed: Jun. 22, 2017

(65) Prior Publication Data

US 2017/0371597 A1     Dec. 28, 2017

(30) Foreign Application Priority Data

Jun. 22, 2016   (CN) .......................... 2016 1 0459022

(51) Int. Cl.
| | |
|---|---|
| G06F 3/00 | (2006.01) |
| G06F 3/06 | (2006.01) |
| G06F 12/0868 | (2016.01) |
| G06F 12/0804 | (2016.01) |
| G06F 40/205 | (2020.01) |
| G06F 12/06 | (2006.01) |
| G06F 40/226 | (2020.01) |
| G06F 11/16 | (2006.01) |

(52) U.S. Cl.
CPC .......... *G06F 3/0689* (2013.01); *G06F 3/0614* (2013.01); *G06F 3/0646* (2013.01); *G06F 12/063* (2013.01); *G06F 12/0804* (2013.01); *G06F 12/0868* (2013.01); *G06F 40/205* (2020.01); *G06F 11/1662* (2013.01); *G06F 40/226* (2020.01); *G06F 2212/1041* (2013.01); *G06F 2212/263* (2013.01); *G06F 2212/312* (2013.01)

(58) Field of Classification Search
None
See application file for complete search history.

(56) References Cited

U.S. PATENT DOCUMENTS

| | | |
|---|---|---|
| 6,898,685 B2 | 5/2005 | Meiri et al. |
| 8,327,080 B1 | 12/2012 | Der |
| 8,327,103 B1 | 12/2012 | Can et al. |

(Continued)

*Primary Examiner* — Reginald G Bragdon
*Assistant Examiner* — Michael L Westbrook
(74) *Attorney, Agent, or Firm* — BainwoodHuang

(57) ABSTRACT

Embodiments of the present invention provide a method and a system for managing a storage system. Specifically, in one embodiment of the present invention there is provided a method for managing a storage system, the method comprising: in response to receiving a write request for writing target data to the storage system, writing the target data to an intermediate address range in an intermediate storage area of the storage system; parsing, based on an address mapping of the storage system, a target address range associated with the write request so as to obtain an actual address range; and moving the target data from the intermediate address range to the actual address range. In one embodiment of the present invention there is further provided a corresponding system and apparatus.

16 Claims, 14 Drawing Sheets

(56) References Cited

U.S. PATENT DOCUMENTS

| | | | |
|---|---|---|---|
| 8,798,262 B1 | 8/2014 | Raizen et al. | |
| 9,256,527 B2 | 2/2016 | Bux et al. | |
| 9,535,841 B2 | 1/2017 | Hirao et al. | |
| 10,061,540 B1 | 8/2018 | Koli et al. | |
| 10,146,454 B1 | 12/2018 | Koli et al. | |
| 2003/0069671 A1* | 4/2003 | Yashiki | G11C 16/102 701/1 |
| 2006/0010282 A1* | 1/2006 | Kim | G06F 11/1417 711/103 |
| 2008/0065810 A1* | 3/2008 | Spanel | G06F 11/348 711/3 |
| 2010/0174853 A1* | 7/2010 | Lee | G06F 12/0246 711/103 |
| 2012/0331234 A1* | 12/2012 | Hirao | G06F 12/084 711/135 |
| 2014/0089558 A1* | 3/2014 | Baderdinni | G06F 12/0871 711/102 |

\* cited by examiner

METHOD AND SYSTEM FOR MANAGING STORAGE USING AN INTERMEDIATE STORAGE AREA

RELATED APPLICATIONS

This application claim priority from Chinese Patent Application Number CN201610459022.3, filed on Jun. 22, 2016 at the State Intellectual Property Office, China, titled "METHOD AND SYSTEM FOR MANAGING STORAGE SYSTEM" the contents of which is herein incorporated by reference in its entirety.

FIELD

Various embodiments of the present invention relate to storage management, and more specifically, to a method and system for managing a storage system (e.g. Redundant Array of Independent Disks, RAID).

BACKGROUND

With the development of data storage techniques, various data storage devices now provide users with higher data storage capacity, and also their speed of accessing data has been increased greatly. So far various RAID-based data storage systems have been developed to increase data reliability. When one or more disks in a storage system fail, data in failing disks can be recovered from data in other disks operating normally.

The storage system may be accessed via storage control nodes. In a typical active-active (also referred to as dual active) type of storage system, two storage node controls work jointly to process data access operations on the storage system and further provide higher availability and better performance. Each storage control node has its own memory (e.g. cache), and memories in two storage controllers operate in a mirroring mode.

Besides the increase of data storage capacity, users also impose greater demands on response time of storage systems. At this point, it becomes a focus of research regarding how to improve data response efficiency while ensuring data consistency in storage systems.

SUMMARY

Therefore, it is desirable to develop and implement a technical solution for managing a storage system and improving response efficiency and reliability of the storage system. It is desired that the technical solution can be compatible with existing storage systems and manage existing storage systems in a more secure and reliable way without any extra hardware devices added to them.

In one embodiment of the present invention, there is provided a method for managing a storage system, the method comprising: in response to receiving a write request for writing target data to the storage system, writing the target data to an intermediate address range in an intermediate storage area of the storage system; parsing, based on an address mapping of the storage system, a target address range associated with the write request so as to obtain an actual address range; and moving the target data from the intermediate address range to the actual address range.

In one embodiment of the present invention, there is provided a system for managing a storage system, the system comprising: one or more processors; a memory coupled to at least one processor of the one or more processors; computer program instructions stored in the memory which, when executed by the at least one processor, cause the system to execute a method for managing a storage system, the method comprising: in response to receiving a write request for writing target data to the storage system, writing the target data to an intermediate address range in an intermediate storage area of the storage system; parsing, based on an address mapping of the storage system, a target address range associated with the write request so as to obtain an actual address range; and moving the target data from the intermediate address range to the actual address range.

With the technical solution of the present invention, a storage system can be managed in a more secure and reliable manner, and further response efficiency and reliability of the storage system improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
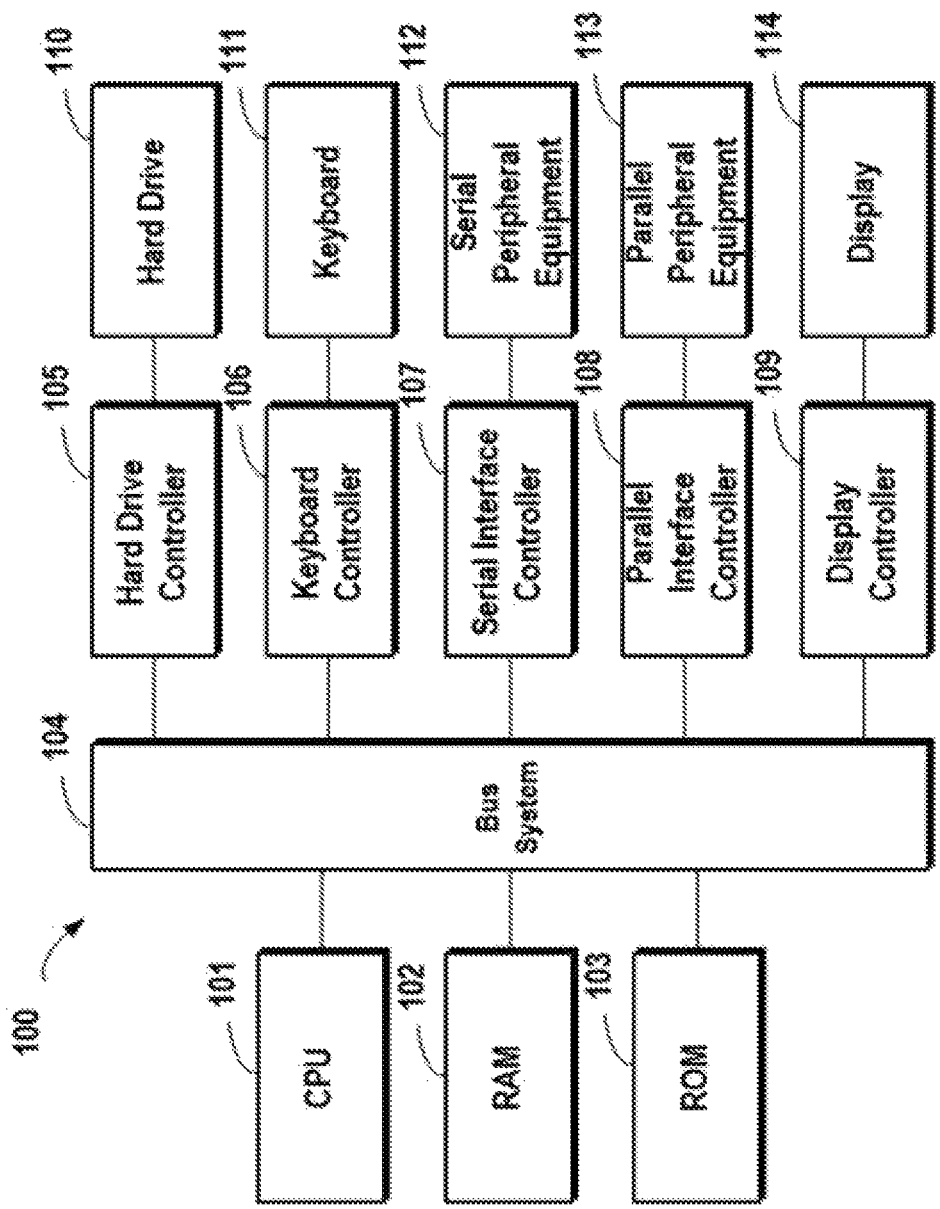
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, portable compact disc read-only memory (CD-ROM), an optical storage device, a magnetic storage device, or any suitable combination of the foregoing. In the context, of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art should understand that illustrated above is just a typical example of an application environment where the various embodiments of the present invention can be implemented. Throughout the context of the present invention, the various embodiments of the present invention may be implemented in various application environments that are known already or to be developed later.

In a storage system like RAID, active/active (also called dual active) is one example of typical storage array models. In this model, two storage controllers work together to process inputs/outputs on the storage array for providing higher availability and better performance. Each storage controller has its own memory (e.g., cache). The pair of caches in two controllers operates in a mirroring mode: when a host performs a write to the storage array, the host issues a write command to one controller's cache, and subsequently the controller mirrors to-be-written data to the peer's cache via a connection channel (e.g., PCI Express Channel) connecting the two controllers. Thus, the host write to the storage array is completed. In this example, the controller's cache is persistent: data in the cache is preserved across controller crashes/resets, so long as power is not lost.

Existing storage systems can support mapped LUN or pool LUN which consists of a set of extents or slices allocated from some traditional LUNs in the storage pool. When mapped LUN receives a write command, it has to firstly get the mapping information (which may be read from storage) between the slices and underlying LUNs. If the write spans several slices, it needs to split the write into a plurality of sub-writes and redirect the sub-writes to the corresponding underlying LUNs according to the mapping. However, the operation performance of mapped LUN is rather dissatisfactory when performing the write.

So far there have been provided technical solutions for improving the write efficiency of storage arrays. In one of technical solutions, data could be written to a temporary storage area in pre-allocated slices, and then "write completion" information could be returned to the host performing the write. In this technical solution, data has to be moved between the temporary storage area and target storage locations (i.e., data is read from the temporary storage area and is written to target storage locations, and then the data in the temporary storage area is invalided). In this manner, on the one hand it is difficult to ensure the atomicity of the data move (i.e., the move is performed to all written data), and further data conflict in the storage system might be caused; on the other hand, the "reading-writing-invalidating" operation process requires a longer time and does not help to improve the work efficiency of the storage system. Therefore, now it becomes a focus of research regarding how to move data in the temporary storage area to the storage array in a secure and high-efficiency way.

In the application environment of the present invention, to maintain data integrity and consistency of data in the storage system, the data move (i.e., move from the temporary storage area to the storage array) should be performed in an atomic way. That is, either all data is moved or nothing is moved at all. Once data move is successful, destination LUN would have the same piece of data as source LUN and the data in the source LUN is no longer valid.

In a storage system such as Redundant Array of Independent Disks (RAID), multiple storage devices may be combined into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-2, RA1D-3, RAID-5, RAID-6, RAID-10, RAID-50, etc.

For more details about RAID levels, those skilled in the art may refer to https://enwikipediaorg/wiki/Standard_RAID_Levels and https://en.wikipedia.org/wiki/Nested_RAID_levels, etc. The operating system may consider a disk array, consisting of multiple storage devices, as a single logical storage unit or disk. By partitioning the disk array into multiple stripes, data may be distributed across multiple storage devices, so that low delay and high bandwidth is achieved, and data can be recovered to some extent when some disks are broken.

Figure 2A:
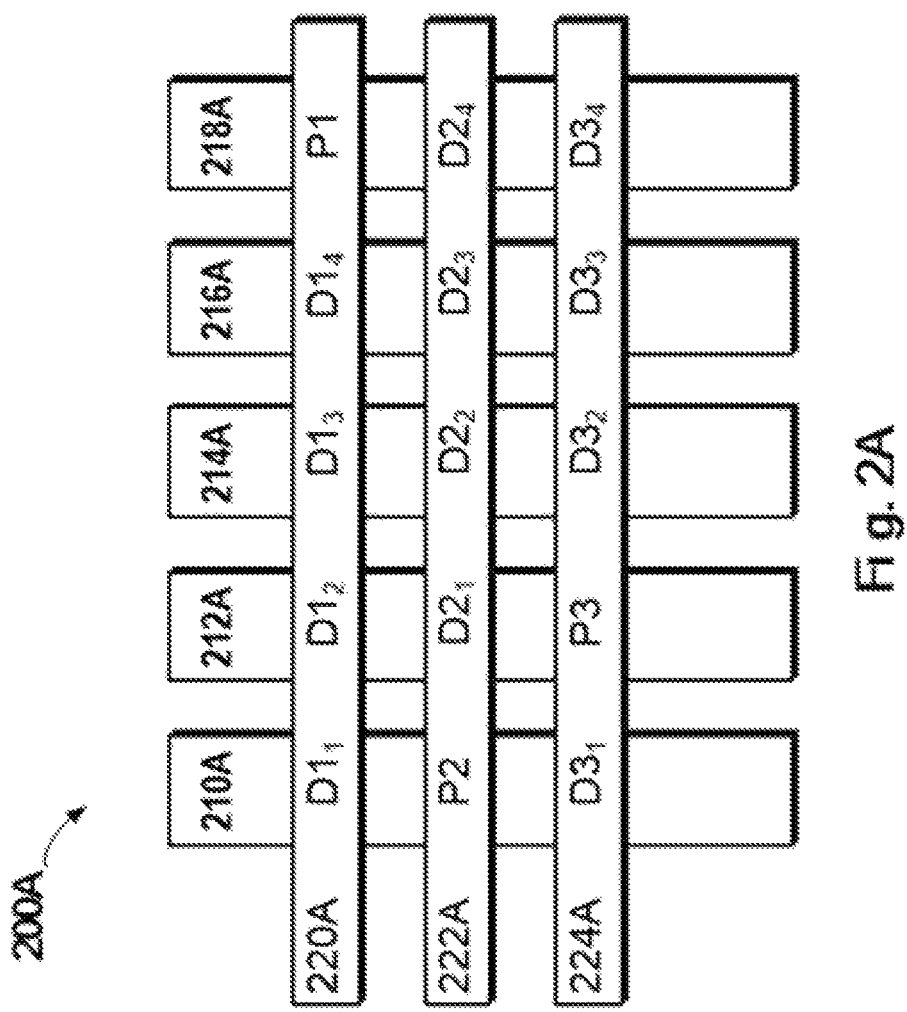
FIG. 2A schematically illustrates a schematic view of a structure of a Redundant Array of Independent Disks according to one technical solution, and FIG. 2B schematically illustrates a schematic view of rebuilding process of a Redundant Array of Independent Disks according to one technical solution.

FIG. 2A schematically illustrates a schematic view 220A of a structure of RAID according to one technical solution. In this figure, working principles of RAID are illustrated by taking RAID-5 that consists of five independent storage devices (210A, 212A, 214A, 216A and 218A) as an example. It should be noted although five storage devices are schematically shown in FIG. 2A, in other embodiments more or less storage devices may be comprised according to different versions of RAID. Moreover, although in FIG. 2A there are shown stripes 220A, 222A and 224A, in other examples the RAID system may further comprise different numbers of stripes.

In RAID, a stripe crosses multiple physical storage devices (for example stripe 220A crosses the storage devices 210A, 212A, 214A, 216A and 218A). The stripe may be simply construed as a storage area among multiple storage devices which satisfies a given address range. Data stored in stripe 220 comprises multiple parts: a data block $D1_1$ stored in storage device 210A, a data block $D1_2$ stored in the storage device 212A, a data block $D1_3$ stored in storage device 214A, a data block $D1_4$ stored in storage device 216A, and a data block P1 stored in storage device 218A. In this example, data blocks $D1_1$, $D1_2$, $D1_3$ and $D1_4$ are stored data, and data block $P^1$ is the parity of the stored data.

The mode of storing data in other stripes is similar to that in the stripe 220A, and the difference is that the parity about other data block may be stored in other storage device than storage device 218A. In this way, when one of the multiple storage devices 210A, 212A. 214A, 216A and 218A fails, data in the failing device may be recovered from other normal storage devices.

Figure 2B:
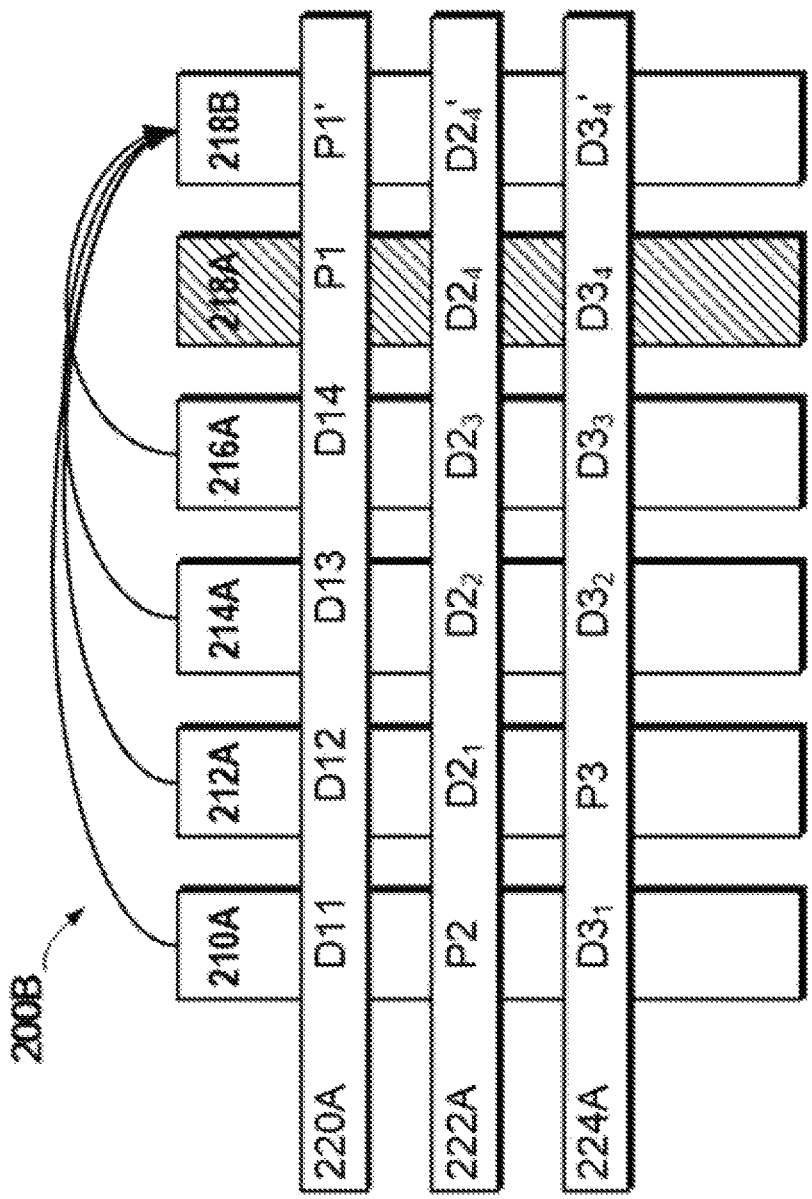

FIG. 2B schematically illustrates a schematic view 220B of rebuilding process of RAID according to one technical solution. As shown in FIG. 2B, when one storage device (e.g. the storage device 218A shown in shadow) fails, data may be recovered from other storage devices 210A, 212A, 214A and 216A that operate normally. At this point, a new backup storage device 218B may be added to RAID to replace the storage device 218A. In this way, recovered data may be written to the storage device 218B, and system rebuilding may be realized.

Figure 3:
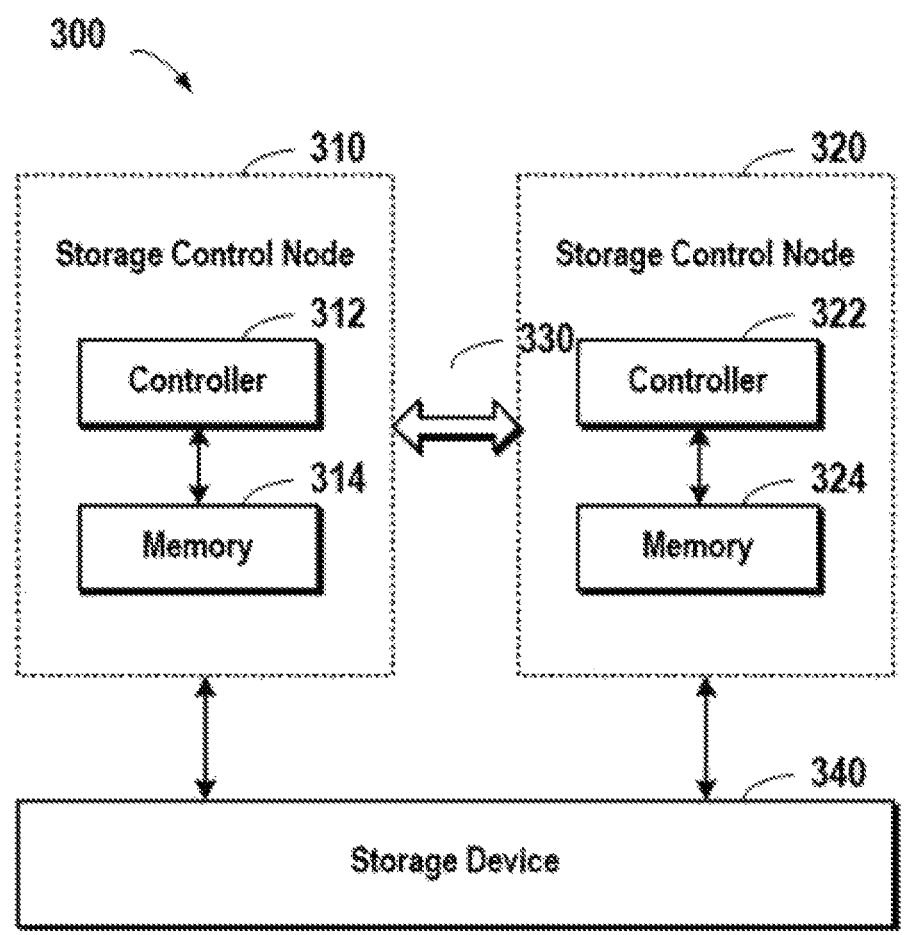
FIG. 3 schematically illustrates a schematic view of a method for managing storage system according to one technical solution.

FIG. 3 schematically illustrates a schematic view of a method for managing a storage system 300 according to one technical solution. As shown in FIG. 3, a storage system 300 may provide data access service to the outside via one or more storage control nodes. In this example, the storage system 300 may comprise the storage control nodes 310 and 320. During operation of the storage system 300, two storage control nodes 310 and 320 may provide service to the outside in parallel. If one node fails, then the other node may continue working.

Storage control node 310 may comprise a controller 312 and a memory 314 (e.g. cache). When the storage control node 310 receives an access request (e.g. read and write request) from an external host, the controller 312 processes the request. Similarly, the other storage control node 320 comprises a controller 322 and a corresponding memory 324, and operates in a manner similar to the storage control node 310. Two storage control nodes 310, 320 may operate in parallel for processing different access requests with respect to a storage device 340. To ensure the consistency of data in the storage system, an internal communication channel 330 is arranged in the storage system for transmitting messages between the two storage control nodes 310 and 320.

Based on the architecture of existing storage systems, in one embodiment of the present invention there is provided a method for managing a storage system, the method comprising: in response to receiving a write request for writing target data to the storage system, writing the target data to an intermediate address range in an intermediate storage area of the storage system; based on an address mapping of the storage system, parsing a target address range associated with the write request, so as to obtain an actual address range; and moving the target data from the intermediate address range to the actual address range.

Figure 4:
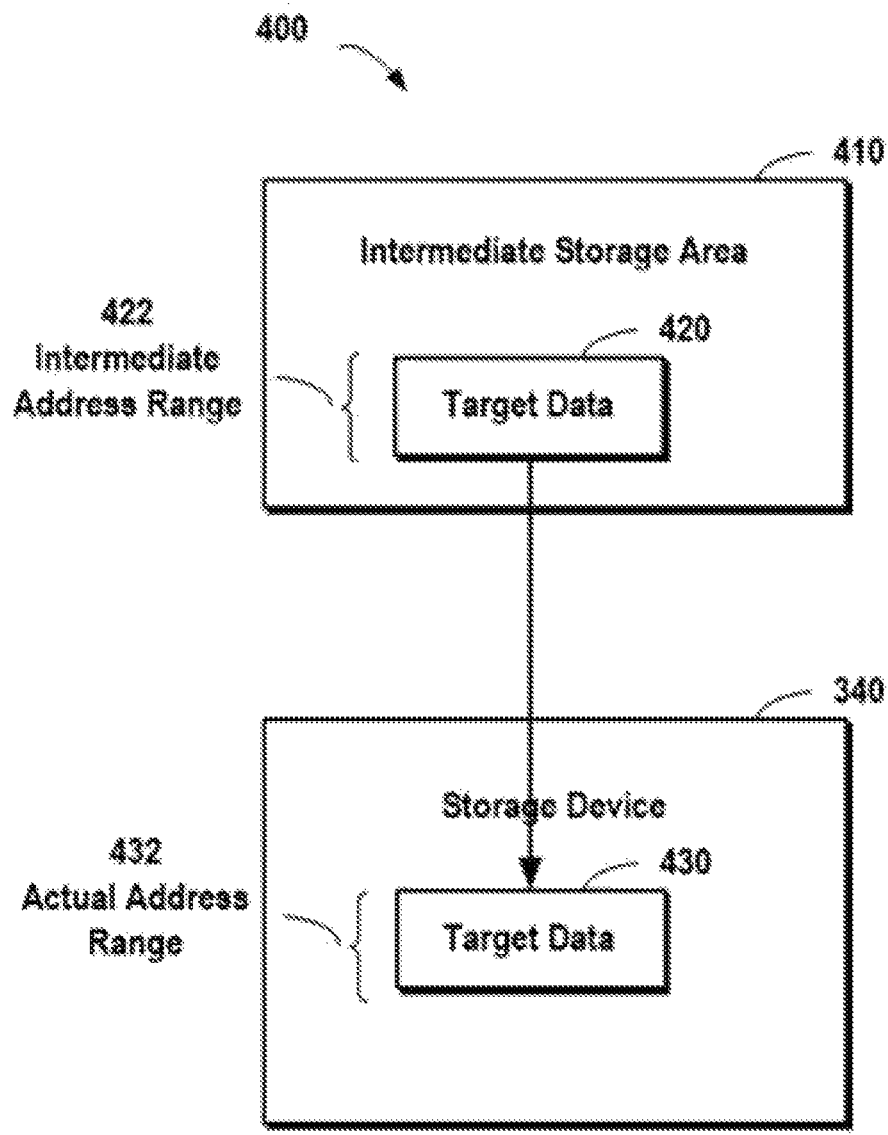
FIG. 4 schematically illustrates an architecture view of a technical solution for managing a storage system according to one embodiment of the present invention.

FIG. 4 schematically shows an architecture view 400 of a technical solution for managing a storage system according to one embodiment of the present invention. As shown in FIG. 4, to improve the storage system's efficiency of responding to write requests from external hosts, an intermediate storage area 410 is deployed in the storage system, so that when the storage system receives a write request for writing target data to a target address, the target data may be first written to the intermediate storage area 410 (e.g., an intermediate address range 422). After the target data is written to the intermediate storage area, a message reading write completion may be returned to the host issuing the write request. Later, based on an internal address mapping of the storage system, a target address range associated with the write request is parsed so as to obtain an actual address range. Meanwhile, inside the storage system, the target data 320 at the intermediate address range 422 is moved, to an actual address range 432 in the storage device 340.

Note throughout the context of the present invention, the storage system may be a storage system that supports Logic Unit Numbers (LUNs), and at this point the target address range may be mapped to one or more storage devices. In addition, the storage device here may be either a logic storage device or a physical storage device. When writing target data to the storage device 340, those skilled in the art may carry out the write in view of difference of specific application environments.

Figure 5:
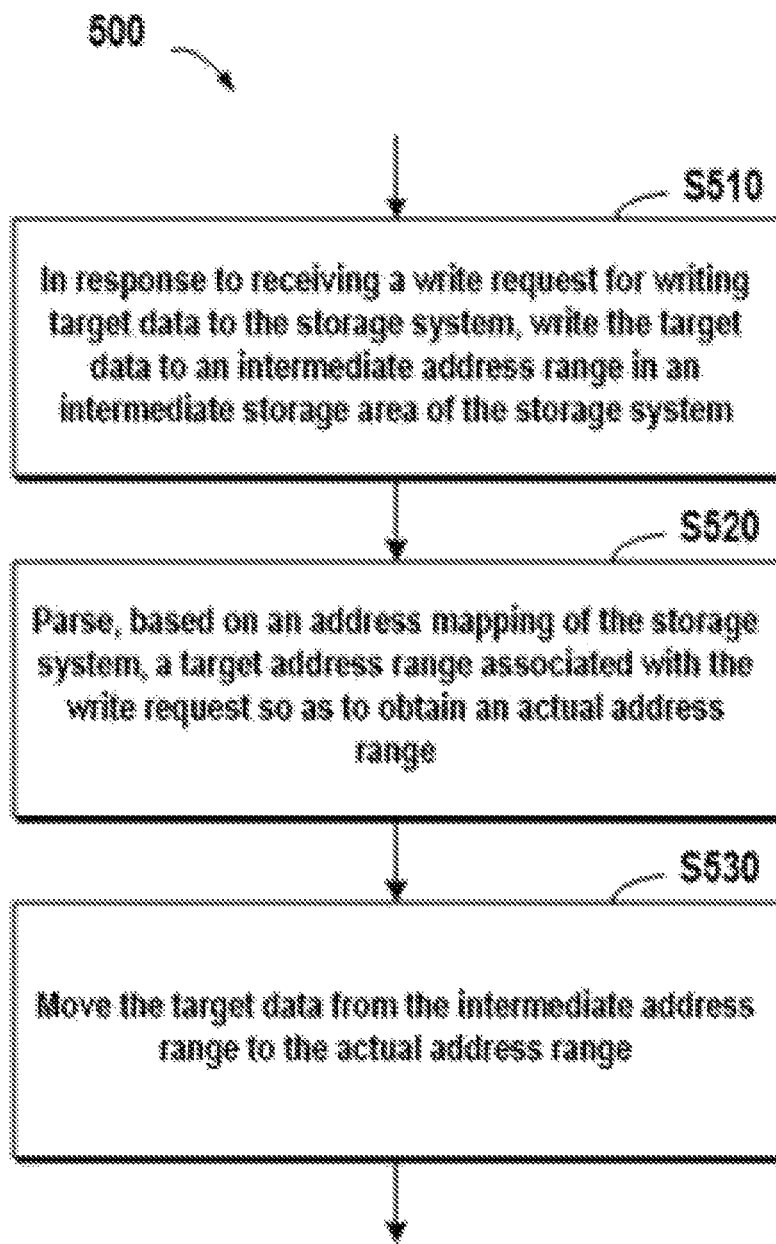
FIG. 5 schematically illustrates a flowchart of a method for managing a storage system according to one embodiment of the present invention.

With reference to FIG. 5, detailed description is presented below to concrete operation steps of one embodiment. Specifically, FIG. 5 schematically shows a flowchart 500 of a method for managing a storage system according to one embodiment of the present invention. In step S510, in response to receiving a write request for writing target data to the storage system, the target data is written to an intermediate address range in an intermediate storage area of the storage system. In this step, the write request describes the following information: (1) target data, i.e., data to be written to the storage system; 2) target address, i.e., where in the storage system the data will be written to. In the embodiment of the present invention, after the target data, is written to the intermediate storage area of the storage system, a signal indicating write success may be returned to the host issuing the write request, and subsequently in steps S520 and S530 background processing is executed inside the storage system so as to write the target data to the target address.

In step S520, based on an address mapping of the storage system, a target address range associated with the write request is parsed so as to obtain an actual address range. With the development of storage systems, the storage system is no longer limited to a single storage device (e.g., storage disk) at the same location, but the storage system may cross multiple logic/physical storage devices at one or more physical locations. Hence, the "target address" which the storage system has received is not a physical address that is addressable directly, but the actual address range associated with the target address range has to be found through address mapping. In this step, the target address range may be mapped to the actual address range used for storing the target data based on the address mapping of the storage system.

In step S530, the target data is moved from the intermediate address range to the actual address range. After obtaining the actual address range, data move operation may be executed inside the storage system.

In one embodiment of the present invention, there is further comprised: in response to the target data being written to the intermediate address range in the intermediate storage area of the storage system, returning a response signal to the write request so as to indicate the write request is completed. Note since at this point the signal reading write completion has been returned to the host issuing the write request, operations in steps S520 and S530 are invisible to the external host but only background operations inside the storage system. In this way, the efficiency of data write can be improved for the external host.

In one embodiment of the present invention, a data move request may be defined in the storage system so as to describe the operation shown in step S530. The data move request here needs to comprise an intermediate address range and an actual address range. The purpose of storing these two addresses is to notify the storage system of specific content of the data move operation, i.e., notify the storage system to move the target data from the intermediate address range to the actual address range. Those skilled in the art may define different data structures to describe these two address ranges. For example, they may describe the address range based on two tuples (start address, end address); alternatively, they may describe the address range based on (start address, data length); alternatively, those skilled in the art may further define other data structures.

Figure 6:
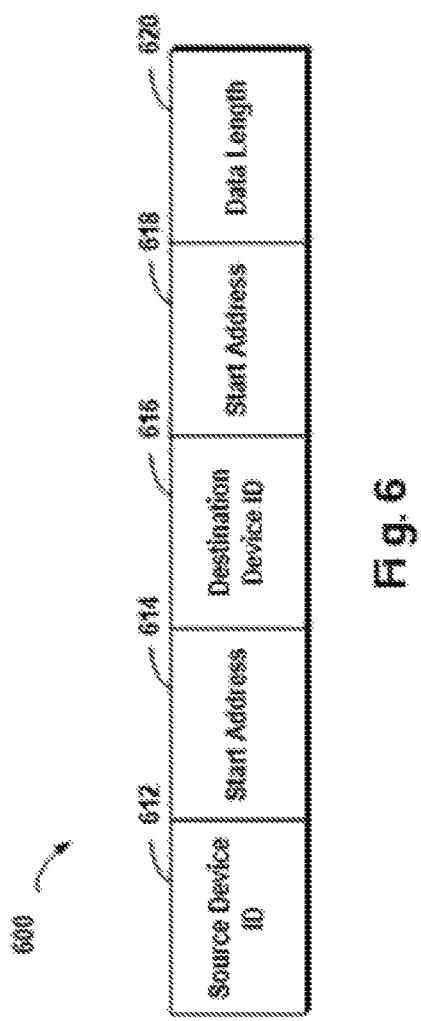
FIG. 6 schematically illustrates a schematic view of a data structure for indicating a data move request, wherein the data move request moves the target data from the intermediate address range to the actual address range.

In one embodiment of the present invention, the storing the intermediate address, range and the actual address range comprises: storing a storage device number of the intermediate address, a start, address of the intermediate address in the storage device, a storage device number of the actual address, a start address of the actual address in the storage device, as well as a length of the target data. With reference to FIG. 6, detailed description is presented below. FIG. 6 schematically shows a schematic view of a data structure for indicating a data move request according to one embodiment of the present invention, wherein the data move request moves the target data from the intermediate address range to the actual address range.

Note in a specific application environment the storage system may comprise one or more storage devices, so ID of a storage device and a start address in the storage device should be indicated while describing an address. As shown in FIG. 6, a source device ID 612 may indicate the ID of a storage device where the intermediate storage area is located; when the storage device is identified by LUN ID in the storage system, the source device ID here may be identified by LUN ID. A start address 614 may indicate a start address of the target data in the intermediate storage area, for example, may be described by a Logic Block Address (LBA).

A destination device ID 616 indicates where the target data is expected, to be written to; like source device ID 612, destination device ID 616 may be identified using LUN ID, and LBA is used to indicate that the location of LBA is the start address in the destination device where the target data will be stored. In addition, a data length 620 indicates the length of the target data, i.e., the size of a storage space occupied by the target data.

Note by defining a dedicated data move request, on the one hand information on a data object of the data move operation to be executed can be described clearly, and on the other hand the data move request can be stored so that when the data move operation is interrupted abnormally, the uncompleted data move operation may be continued and further the security of data in the storage system is ensured.

In one embodiment of the present invention, there is further comprised: in response to the target data crossing multiple storage devices in the storage system, parsing the target address range into multiple actual address ranges; and the moving the target data from the intermediate address range to the actual address range comprises: with respect to each actual address range in the multiple actual address ranges, moving a part in the target data, which corresponds to the actual address range, to the actual address range.

Figure 7:
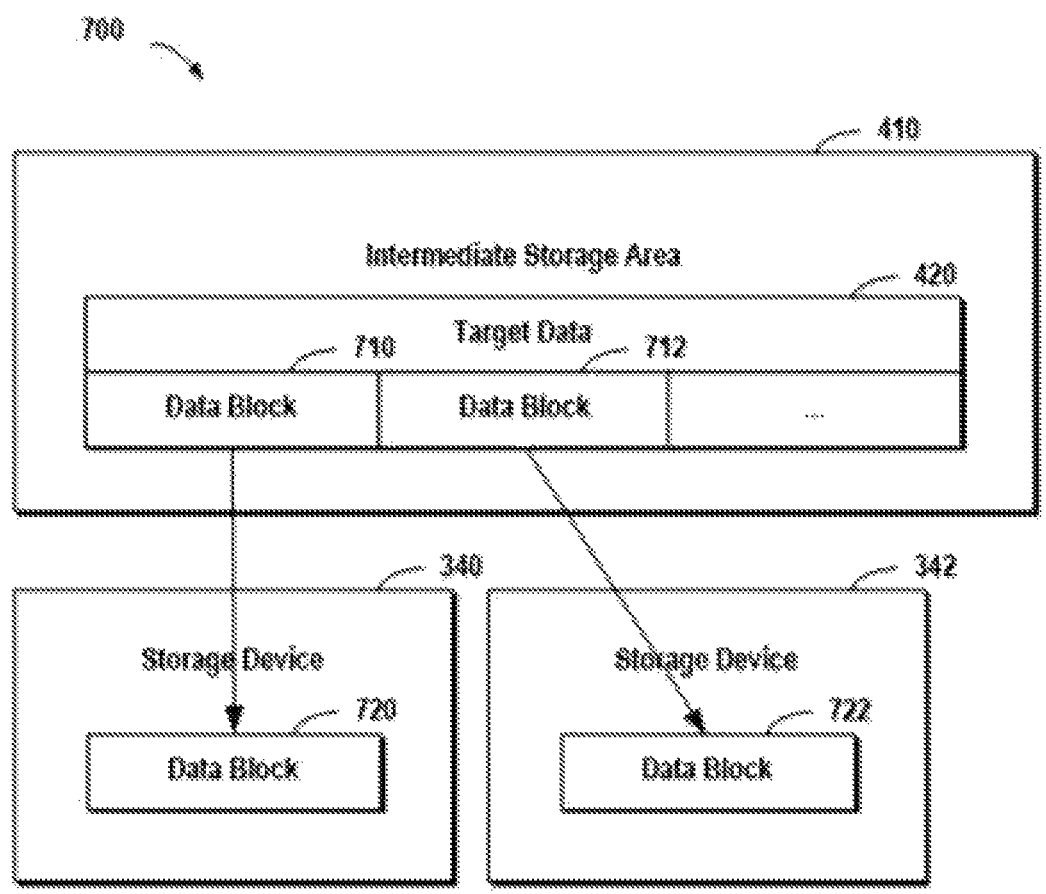
FIG. 7 schematically illustrates an architecture view of a technical solution for managing a storage system according to one embodiment of the present invention.

The host's write request with respect to the storage system might involve various situations. For example, the size of to-be-written target data might be small, and then at this point the target data might be on one storage device in the storage system. For another example, if the to-be-written data is quite large, then at this point the target data might be on multiple storage devices. If parts in the target data are written to the multiple storage devices one after another, a lot of time will be spent and further the response efficiency of the storage system will decrease. In this embodiment, the whole target data is stored in the intermediate memory, and then write completion is sent to the host. Then, the target data is divided into an appropriate number of data blocks according to the address mapping, and these data blocks are moved to corresponding storage devices. With reference to FIG. 7, detailed description is presented now to specific implementation steps.

FIG. 7 schematically shows an architecture view 700 of a technical solution for managing a storage system according to one embodiment of the present invention. As shown in FIG. 7, the target data 420 has been written to intermediate storage area 410, the target data 420 has been divided into multiple data blocks 710, 712, . . . . According to the address mapping of the storage system, and the multiple data blocks 710, 712 . . . will be held in multiple storage devices 340, 342, . . . in the storage system. Specifically, it may be learned from the address mapping that the data block 710 will be saved in the storage device 340, and the data block 712 will be saved in storage device 342, etc.

In this embodiment, various data blocks may be moved to respective locations by means of the above-described data move request. For example, regarding the data block 710, suppose the start address of the data block 710 in the intermediate storage area 410 (source device ID: LUN 0) is: 0xAA . . . 0000; from the address mapping it may be learned that the data block 710 is desired to be written to the following start address of the storage device 340 (destination device ID: LUN 1): 0xBB . . . 0000; and the size of the data block 710 is 1M. At this point, according to the format of the data move request as described above, operations of moving the data block 710 may be described in the manner below:

Data move request 1: (LUN 0, 0xAA . . . 0000, LUN 1, 0xBB . . . 0000, 1M).

For another example, regarding the data block 712, suppose the start address of the data block 712 in the intermediate storage area 410 (source device ID: LUN 0) is 0xCC . . . 0000; from the address mapping it may be learned that the data block 712 is desired to be written to the following start address of the storage device 342 (destination device ID: LUN 2): 0xDD . . . 0000; and the size of the data block 712 is 1M. At this point, according to the format of the data move request as described above, operations of moving the data block 712 may be described in the manner below:

Data move request 2: (LUN 0, 0xCC . . . 0000, LUN 2, 0xDD . . . 0000, 1M).

Note illustrated above is only the situation where the template data is distributed across two storage devices and the data move operation involves two data move requests (i.e., data move requests 1 and 2). In other embodiments, when the target data crosses more mobile devices, the data, move operation may further involve more data move requests. Further note in the various embodiments of the present invention, it is not intended to limit concrete configuration of the storage devices 340 and 342. In fact, the storage device here may either take the form of physical device or take the form of logical storage device. When the storage device is a logical storage device, the database has to be written to an actual storage address of a physical storage device associated with the logical storage device based on concrete information of the logical storage device. Those skilled in the art may define concrete operation steps based on techniques that are already known or to be developed later; details are ignored here.

In one embodiment of the present invention, to improve the efficiency of data move operations, an address pointer associated with the actual address may be modified to point to the address associated with the target data by modifying the address pointer. Specifically, in one embodiment of the present invention, the moving the target data from the intermediate address range to the actual address range comprises: loading the target data within the intermediate address range to a memory of the storage system, so as to obtain a first address range of the target data in the memory; and making an address pointer associated with the actual address range in the memory point to the first address range.

In this embodiment, the target data within the intermediate address range may be loaded to a memory (e.g., cache in the storage system). Note since the target data has been loaded to the cache while being written to the intermediate storage area, when executing this step, if the target data is still in the cache (i.e., hit), it does not have to be loaded again; and the loading operation is performed only when the target data is not hit.

After the loading operation, a first address range of the target data in the memory can be obtained. Here, the data move is completed only by the address pointer operation without actual data copying. In other words, by directing the address pointer associated with the actual address range in the memory to the first address range, a mapping between the first address range and the actual address range is established. In subsequent steps, data within the first address range will be flushed to the actual address range, at which point actual data write is completed.

Note the cache has specific storage units, and operations regarding the cache are performed using these storage units as the unit. Specifically, the cache is divided into fix-sized cache pages (the page is the smallest management unit in cache, e.g., 8K). A cache logical page (CLP) consists of multiple cache pages (e.g., 8) for storing larger piece of continuous LUN data. The storage system maintains the mapping between cache pages and data on LUN, such as LUN ID, start LBA and pointers to cache pages. In addition, CLP maintains the sector status (dirty, clean or invalid) of its cache pages.

In one embodiment of the present invention, the storage system comprises a first controller and a second controller, the write request is received from the first controller. The method further comprises: locking the destination address range and the source address range in the memory. In this embodiment, since both the two controllers comprised in the storage system can respond to data access requests from the outside, to avoid possible conflict during the data move operation, address ranges associated with the data move operation need to be locked.

Figure 8:
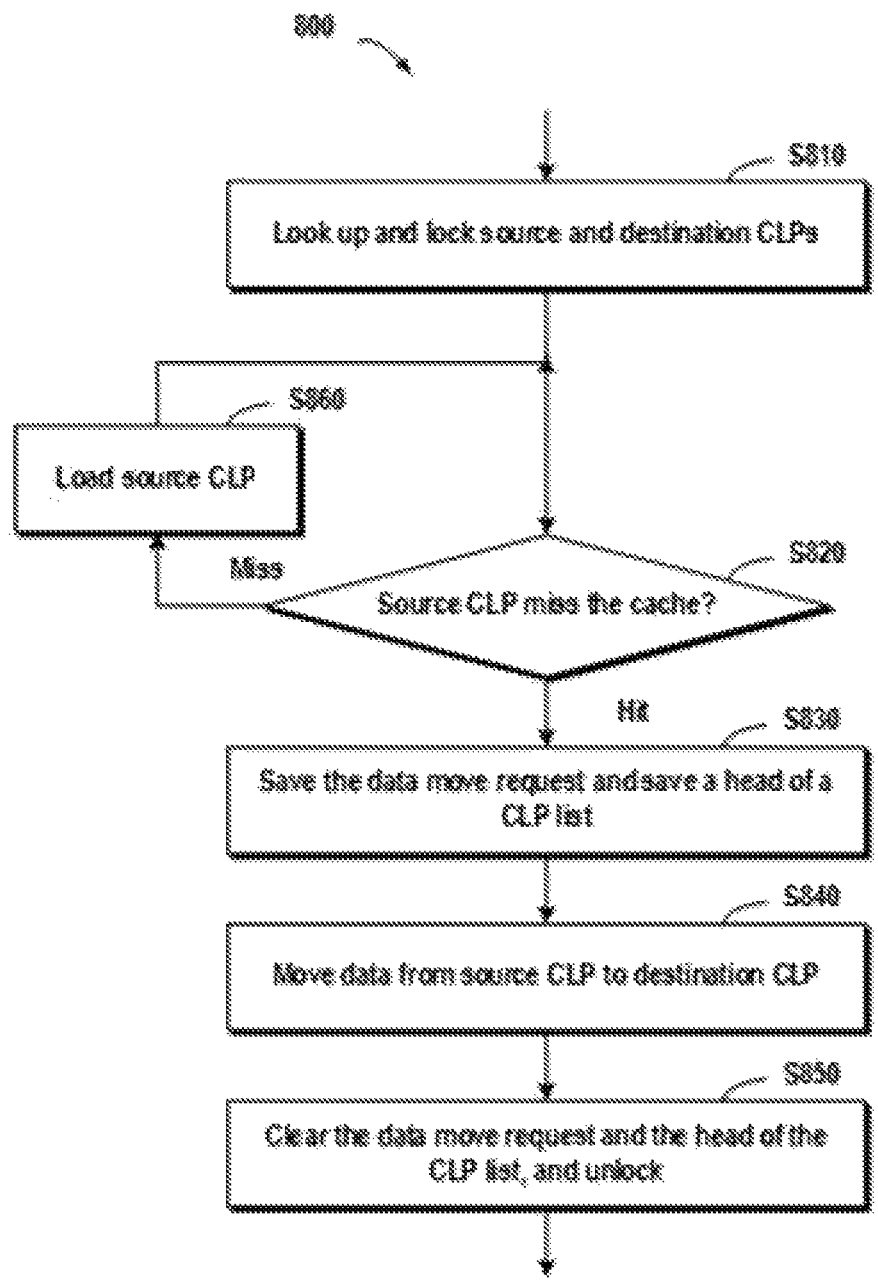
FIG. 8 schematically illustrates a flowchart of a method for managing a storage system according to one embodiment of the present invention.

Hereinafter, detailed steps of the embodiment of the present invention will be described with reference to concrete examples. FIG. 8 schematically shows a flowchart 800 of a method for managing a storage system according to one embodiment of the present invention. Note the target data, after being loaded to the cache, will be stored in one or more CLPs. Hence, description is presented below to the operation process by taking a concrete example where 3 CLPs are related to the target data. In view of different sizes of the target data, the operation process may further involve more or less CLPs.

First of all, in step S810 all source, and destination CLPs associated with the target data are looked up and locked. Next, the operation flow proceeds to step S820 in which it is judged whether source CLPs are already in the cache (i.e., judge hit or miss). If missing, then the operation flow proceeds to step S860 and the source CLPs are loaded in this step; otherwise, the operation flow proceeds to step S830. In this step 830, the data move request as well as the head of the list of CLPs are saved, for the purpose that where the data move request is interrupted because of abnormality and the like, the uncompleted data move operation may be executed, based on the saved information, so as to ensure the consistency of data in the storage system.

In step S840, data is moved from source CLPs to destination CLPs. In this step, the data move may be implemented by modifying the address pointer under the above principle, instead of by physical executing the data copy. Finally in step S850, after the data move is completed, the data move request saved in step S830 as well as the head of the list of CLPs are cleared, and the locks are released.

In one embodiment of the present invention, there is further comprised: determining status of a storage unit in the first address range; and in response to the status of the storage unit being "dirty," mirroring the storage unit to a second memory associated with the second controller.

Since source CLPs and destination CLPs represent the cached LUN data, moving data from the source LUN to the destination LUN may be accomplished by moving cache pages from source CLPs into destination CLPs. As mentioned earlier, one CLP usually consists of multiple cache pages and maintains sector information of cache page data. In convenience of the description, suppose that one CLP corresponds to only one cache page and one cache page is 8 KB (16 sector) in size. The sectors in the cache page may be dirty (D), valid (V) or invalid (I). Dirty data refers to a type of data that exists in the cache and needs to be flushed to LUN finally. Once flushed to LUN, dirty data becomes valid in the cache which may be discarded when necessary since the data is already flushed to LUN. With reference to FIGS. 9A, 9B, 10A and 10B, description is presented below to concrete examples of the data move process.

Figure 9A:
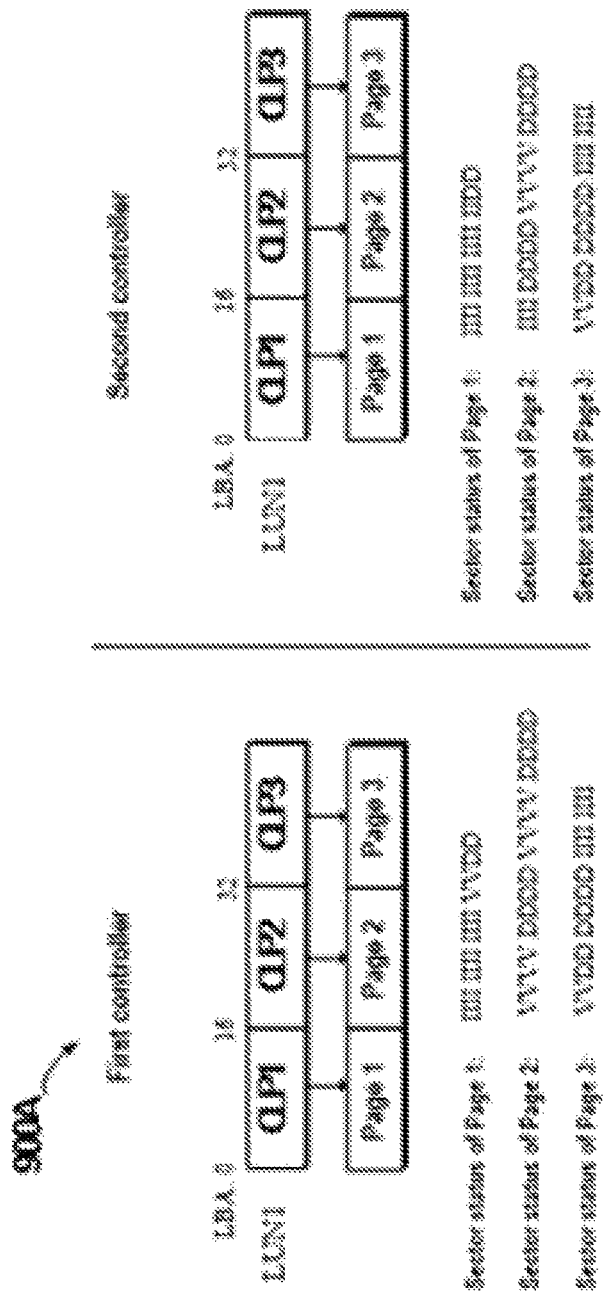
FIG. 9A schematically illustrates status of a source CLP before executing a data move request according to one embodiment of the present invention, and FIG. 9B schematically shows status of a destination CLP before executing a data move request according to one embodiment of the present invention.

FIG. 9A schematically shows status 900A of a source CLP before executing the data move request according to one embodiment of the present invention.

Suppose the target data involves 24 sectors, and it is desired to move the 24 sectors from LUN1: LBA 12 to LUN2: LBA 12 on the first controller. The data move operation covers partial CLP1 (LBA 12 to 15), hall CLP2 (LBA 16 to 31) and partial CLP3 (LBA 32 to 35). In this figure, "D" means dirty, "V" means valid, and "I" means invalid.

Figure 9B:
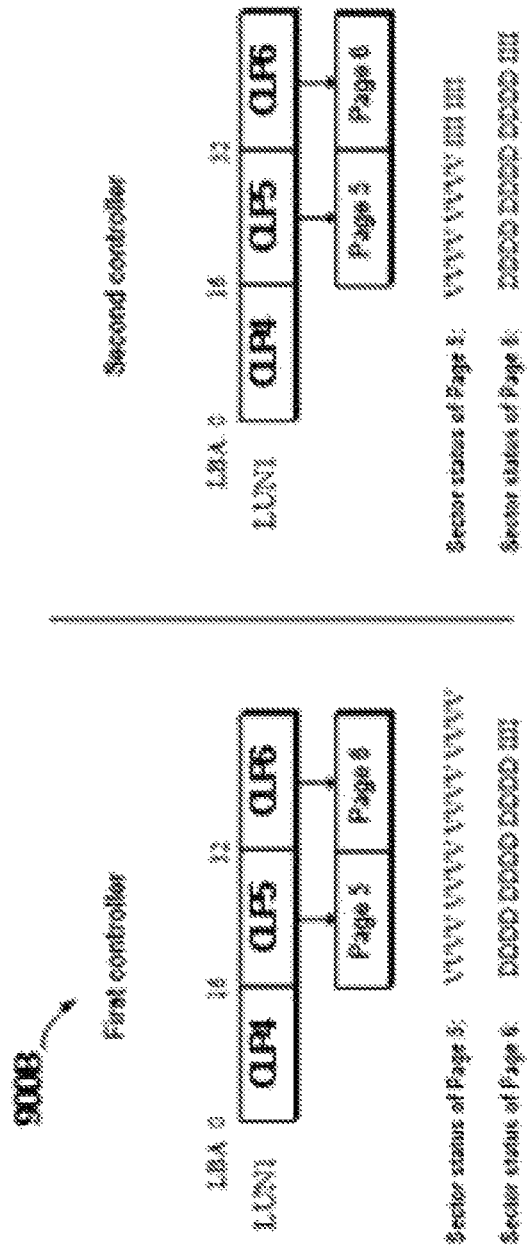

FIG. 9B schematically shows status 900B of a destination CLP before executing the data move request according to one embodiment of the present invention. CLP4 is empty, and CLP5 and CLP6 include data with status as shown in FIG. 9B.

Figure 10A:
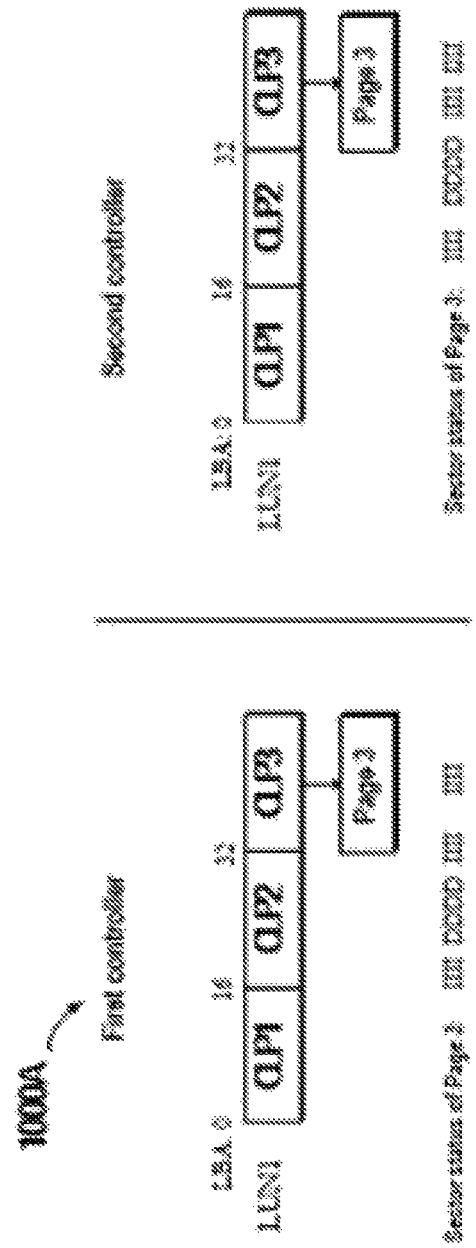
FIG. 10A schematically illustrates status of a source CLP after executing a data move request according to one embodiment of the present invention, and FIG. 10B schematically shows status of a destination CLP after executing a data move request according to one embodiment of the present invention.

Description is presented below to the data move process. The cache pages are used for storing data associated with data in LUN, so the data move may be executed using the cache page as the unit. FIG. 10A schematically shows status of a source CLP after executing the data move request according to one embodiment of the present invention.

For source CLP1, only partial data needs to be moved (from LBA 12 to 15). Since the rest of data in LBA 0 to 11 in CLP are all invalid and the corresponding CLP4 is empty, data in page 1 may be inserted into CLP4 directly and then be removed from CLP1. The sector status in CLP1 will be updated to "IIII IIII IIII IIII" to indicate it has no page any more. Now page 1 is linked to CLP4. The sector status in CLP4 will be updated to "IIII IIII IIII DDDD" so as to flush dirty data to LUN finally.

Note if destination CLP4 has a cache page, but as long as there is no dirty sector from LBA 0 to 11, it is safe to move page 1 into CLP4 directly after moving the existing page to this CLP. Otherwise, sectors have to be copied from page 1 into the existing page in CLP4 in order to avoid data loss.

Since the data move involves all pages (LBS 16 to 31) in source CLP2, it is necessary to delete the existing page 5 in CLP5, insert page 2 into CLP5 directly and then remove page 2 from the CLP2. The sector status in CLP2 should be updated to "IIII IIII IIII IIII" to indicate it has no page any more. Now page 2 is linked to CLP5. The sector status in CLP5 will be updated to "DDDD DDDD DDDD DDDD."

The data move involves partial pages (LBA 32 to 35) in source CLP3. Destination CLP6 includes dirty sectors beyond the move range, the sectors of LBA 32 to 35 have to be copied to a corresponding location of page 6. The sector status in CLP3 should be updated to "IIII DDDD IIII IIII," and the sector status in CLP6 should also be updated to "DDDD DDDD DDDD IIII."

Figure 10B:
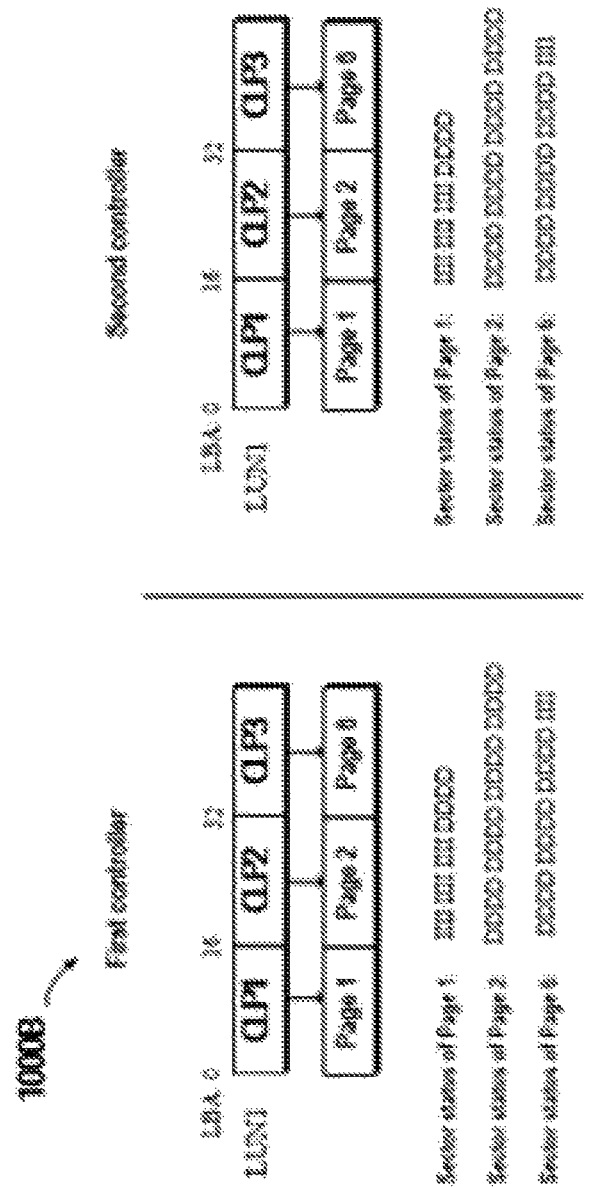

Once the data has been moved/copied from source CLPs to destination CLPs at the first controller, messages may be sent to the second controller for applying the data move to its corresponding CLPs. After receiving the message, the second controller will move page 1 from CLP1 into CLP4, move page 2 from CLP2 into CLP5 and copy the first four sectors in page 3 into page 6, and also update the CLPs' sector status correspondingly. FIG. 10B schematically shows status of a destination CLP after executing the data move request according to one embodiment of the present invention.

In one embodiment of the present invention, there is further comprised: flushing the target data in the first address range to the actual address range. Detailed description is presented above to concrete situations of executing data move in the cache of the storage system with reference to FIGS. 9A, 9B, 10A and 10B. After the data move is executed in the cache, relevant data in the cache may be flushed to a storage device in the storage system.

In one embodiment of the present invention, the intermediate address range and the actual address range are stored; and in response to the moving the target data from the intermediate address range to the actual address range being interrupted, the target data is moved from the intermediate address range to the actual address range based on the intermediate address range and the actual address range being stored.

In this embodiment, there is provided a solution for controller crashes. For example, when the first controller boots up, if the second controller is alive and has a normal cache image, the first controller does not need to perform any recovery check and it just synchronizes with the second controller to obtain the cache image. If the first controller is the only alive controller, it needs to check if there is stored any data move request or not. If yes, it is necessary parse the request's source LUN ID, source start LBA, destination LUN ID, destination start LBA and length of data. In this embodiment, the data move may be re-executed in the manner of executing the data move request as described above.

Since partial data might be moved before the first controller boots up, it is necessary to check the consistency of data between respective CLPs and execute the recovery operation according to the principles below:

1. Fix any inconsistent data. For example, the fixing may comprise processing the following data: the sector status of source CLP or destination CLP that is not updated; both source CLP and destination CLP pointing to the same page (which status indicates that the first controller crashes after inserting the page into destination CLP and before removing the page from source CLP); the page that does not exist in source CLP (for example, it should be asserted that the page is already inserted into destination CLP before the first controller crashes).

2. Continue the interrupted data move operation: if source CLP contains a full page to be moved, then this page is moved into destination CLP and the sector status of both CLPs is updated; if source CLP's partial data contained in its page will be copied, the data will be copied into destination CLP and the sector status of both CLPs updated.

In one embodiment of the present invention, there is further comprised: in response to the target data in the first address range being flushed to the actual address range, unlocking the source address range and the destination address range in the memory. After the data move operation is completed, the related data storage area may be unlocked.

The various embodiments implementing the method of the present invention have been described with reference to the accompanying drawings. Those skilled in the art may appreciate that the method may be implemented in software, hardware or a combination thereof. Moreover, those skilled in the art may appreciate that a device based on the same inventive concept may be provided by implementing respective steps of the method in software, hardware or combination of software and hardware. Even if the device is the same as a general-purpose processing device in hardware structure, the functionality of software contained therein makes the device exhibit distinguishing characteristics over the general-purpose processing device, thereby forming a device according to the various embodiments of the present invention. The device of the present invention comprises several means or modules, which are configured to execute corresponding steps. By reading this specification, those skilled in the art may understand how to write a program to implement actions performed by the means or modules. Since the device and the method are based on the same inventive concept, like or corresponding implementation details also apply to the means or modules corresponding to the method. Since a detailed and complete description has been presented above, details might be ignored below.

Figure 11:
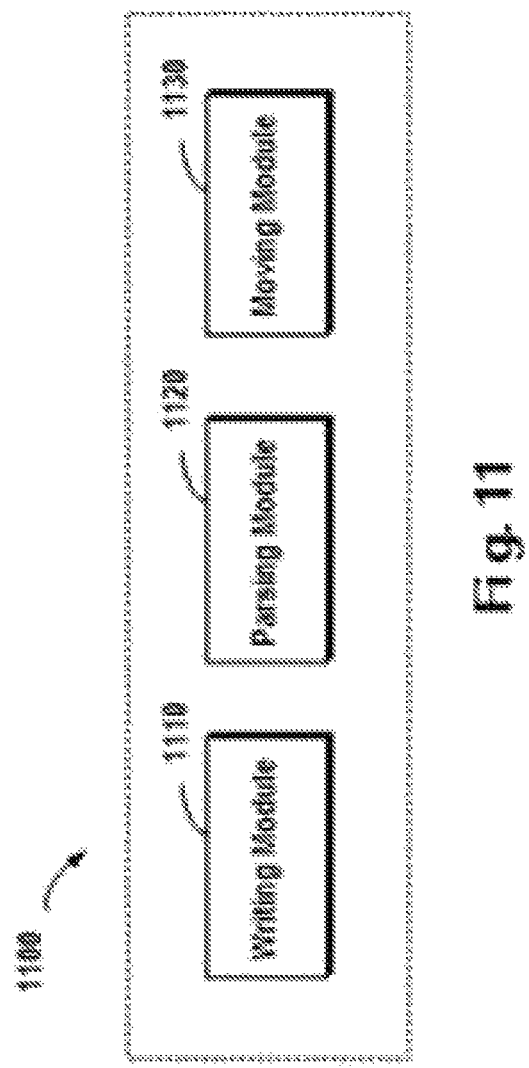
FIG. 11 schematically illustrates a block diagram of an apparatus for managing a storage system according to one embodiment of the present invention.

FIG. 11 schematically shows a block diagram 1100 of an apparatus for managing a storage system according to one embodiment of the present invention. Specifically, there is provided an apparatus for managing a storage system, the apparatus comprising: a writing module configured to, in response to receiving a write request for writing target data to the storage system, write the target data to an intermediate address range in an intermediate storage area of the storage system; a parsing module configured to parse, based on an address mapping of the storage system, a target address range associated with the write request so as to obtain an actual address range: and a moving module configured to move the target data from the intermediate address range to the actual address range.

According to one embodiment of the present invention, there are further comprised: a storage module configured to store the intermediate address range and the actual address range; and a recovery module configured to, in response to the moving the target data from the intermediate address range to the actual address range being interrupted, move the target data from the intermediate address range to the actual address range based on the intermediate address range and the actual address range as stored.

In one embodiment of the present invention, the storage module is further configured to store a storage device number of the intermediate address, a start address of the intermediate address in the storage device, a storage device number of the actual address, a start address of the actual address in the storage device, as well as a length of the target data.

In one embodiment of the present invention, the moving module is further configured to: load the target data within the intermediate address range in a memory of the storage system so as to obtain a first address range of the target data in the memory; and direct an address pointer associated with the actual address range in the memory to the first address range.

In one embodiment of the present invention, the storage system comprises a first controller and a second controller, the write request being received from the first controller, and the apparatus further comprises: a locking module configured to lock the source address range and the destination address range in the memory.

In one embodiment of the present invention, the apparatus further comprises a synchronizing module configured to: determine status of a storage device in the first address range; and in response to the status of the storage device being "dirty," mirror the storage unit to a second memory associated with the second controller.

In one embodiment of the present invention, the apparatus further comprises: flushing the target data in the first address range to the actual address range.

In one embodiment of the present invention, the apparatus further comprises: a flushing module configured to, in response to flushing the target data in the first address range to the actual address range, unlock the source address range and the destination address range in the memory.

In one embodiment of the present invention, the parsing module is further configured to, in response to the target data crossing multiple storage devices in the storage system, parse the destination address range into multiple address ranges; and the moving module is further configured to, with respect to each actual address range among the multiple actual address ranges, move a portion of the target data, which corresponds to the actual address range, to the actual address range.

In one embodiment of the present invention, the apparatus further comprises: a feedback module configured to, in response to writing the target data to an, intermediate address range in an intermediate storage area of the storage system, return a response signal to the write request to indicate that, the write request is completed.

In one embodiment of the present invention, there is provided a system for managing a storage system, the system comprising: one or more processors; a memory coupled to at least one processor of the one or more processors; computer program instructions stored in the memory which, when executed by the at least one processor, cause the system to execute a method, for managing a storage system, the method comprising: in response to receiving a write request for writing target data to the storage system, writing the target data to an intermediate address range in an intermediate storage area of the storage system; parsing, based on an address mapping of the storage system, a target address range associated with the write request so as to obtain an actual address range; and moving the target data from the intermediate address range to the actual address range.

According to one embodiment of the present invention, the method further comprises: storing the intermediate address range and the actual address range; and in response to the moving the target data from the intermediate address range to the actual address range being interrupted, moving the target data from the intermediate address range to the actual address range based on the intermediate address range and the actual address range as stored.

In one embodiment of the present invention, the storing the intermediate address range and the actual address range comprises: storing a storage device number of the intermediate address, a start address of the intermediate address in the storage device, a storage device number of the actual address, a start address of the actual address in the storage device, as well as a length of the target data.

In one embodiment of the present invention, the moving the target data from the intermediate address range to the actual address range comprises: loading the target data within the intermediate address range in a memory of the storage system so as to obtain a first address range of the target data in the memory; and making an address pointer associated with the actual address range in the memory point to the first address range.

In one embodiment of the present invention, the storage system comprises a first controller and a second controller, the write request being received from the first controller, and the method further comprises: locking the source address range and the destination address range in the memory.

In one embodiment of the present invention, the method further comprises: determining status of a storage device in the first address range; and in response to the status of the storage device being "dirty," mirroring the storage unit to a second memory associated with the second controller.

In one embodiment of the present invention, the method further comprises: flushing the target data in the first address range to the actual address range.

In one embodiment of the present invention, the method further comprises: in response to the target data in the first address range being flushed to the actual address range, unlocking the source address range and the destination address range in the memory.

In one embodiment of the present invention, the method further comprises: in response to the target data crossing multiple storage devices in the storage system, parsing the destination address range as multiple address ranges and the moving the target data from the intermediate address range to the actual address range comprises: with respect to each actual address range among the multiple actual address ranges, moving a portion of the target data, which corresponds to the actual address range, to the actual address range.

In one embodiment of the present invention, the method further comprises: in response to the target data being written to an intermediate address range in an intermediate storage area of the storage system, returning a response signal to the write request to indicate that the write request is completed.

In one embodiment of the present invention, there is provided a computer program product, tangibly stored on a non-transient computer readable medium and including machine executable instructions which, when being executed, cause the machine to execute steps of the method described above.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a storage system, the method comprising:
    in response to receiving a write request from an external host for writing target data to a target address range of the storage system, writing the target data to an intermediate address range in an intermediate storage area on a first disk of the storage system;
    in response to the target data being written to the intermediate address range on the first disk, returning, to the external host, a response signal to the write request indicating that the write request is completed;
    parsing, based on an address mapping of the storage system, the target address range of the write request so as to obtain an actual address range on a second disk of the storage system;
    and
    after returning the response signal to the external host, moving the target data from the intermediate address range on the first disk to the actual address range on the second disk.

2. The method according to claim 1, further comprising:
    storing the intermediate address range and the actual address range; and
    in response to the moving the target data from the intermediate address range to the actual address range being interrupted, moving the target data from the intermediate address range to the actual address range based on the stored intermediate address range and the actual address range as stored.

3. The method according to claim 2, wherein the storing the intermediate address range and the actual address range comprises:
    storing a storage device number of the intermediate address, a start address of the intermediate address in the storage device, a storage device number of the actual address, a start address of the actual address in the storage device, and a length of the target data.

4. The method of claim 1, wherein the moving the target data from the intermediate address range to the actual address range comprises:
    loading the target data within the intermediate address range in a memory of the storage system so as to obtain a first address range of the target data in the memory; and
    directing an address pointer associated with the actual address range in the memory to the first address range.

5. The method according to claim 4, wherein the storage system comprises a first controller and a second controller, the write request being received from the first controller, and the method further comprises: locking a source address range and a destination address range in the memory.

6. The method according to claim 5, further comprising:
    determining status of a storage device in the first address range; and
    in response to the status of the storage device being "dirty," mirroring the storage device to a second memory associated with the second controller.

7. The method according to claim 5, further comprising: flushing the target data in the first address range to the actual address range.

8. The method according to claim 7, further comprising:
    in response to the target data in the first address range being flushed to the actual address range, unlocking the source address range and the destination address range in the memory.

9. A system for managing a storage system, the system comprising:
    one or more processors;
    a memory coupled to at least one processor of the one or more processors;
    computer program instructions stored in the memory which, when executed by the at least one processor, cause the system to execute a method for managing a storage system, the method comprising:
        in response to receiving a write request from an external host for writing target data to a target address range of the storage system, writing the target data to an intermediate address range in an intermediate storage area on a first disk of the storage system;
        in response to the target data being written to the intermediate address range on the first disk, returning, to the external host, a response signal to the write request indicating that the write request is completed;
        parsing, based on an address mapping of the storage system, the target address range of the write request so as to obtain an actual address range on a second disk of the storage system;
        and
        after returning the response signal to the external host, moving the target data from the intermediate address range on the first disk to the actual address range on the second disk.

10. The system according to claim 9, wherein the method further comprises:
    storing the intermediate address range and the actual address range; and
    in response to the moving the target data from the intermediate address range to the actual address range being interrupted, moving the target data from the intermediate address range to the actual address range based on the stored intermediate address range and the actual address range as stored.

11. The system according to claim 10, wherein the storing the intermediate address range and the actual address range comprises:
    storing a storage device number of the intermediate address, a start address of the intermediate address in the storage device, a storage device number of the actual address, a start address of the actual address in the storage device, and a length of the target data.

12. The system of claim 9, wherein the moving the target data from the intermediate address range to the actual address range comprises:
    loading the target data within the intermediate address range in a memory of the storage system so as to obtain a first address range of the target data in the memory; and
    directing an address pointer associated with the actual address range in the memory to the first address range.

13. The system according to claim 12, wherein the storage system comprises a first controller and a second controller, the write request being received from the first controller, and the method further comprises: locking a source address range and a destination address range in the memory.

14. The system according to claim 13, wherein the method further comprises:
    determining status of a storage device in the first address range; and
    in response to the status of the storage device being "dirty," mirroring the storage device to a second memory associated with the second controller.

15. The system according to claim 13, wherein the method further comprises: flushing the target data in the first address range to the actual address range.

16. The system according to claim 15, wherein the method further comprises:
- in response to the target data in the first address range being flushed to the actual address range, unlocking the source address range and the destination address range in the memory.

* * * * *